United States Patent
Patterson et al.

(10) Patent No.: US 7,058,762 B2
(45) Date of Patent: Jun. 6, 2006

(54) METHOD AND APPARATUS FOR SELECTING AMONG MULTIPLE DATA RECONSTRUCTION TECHNIQUES

(75) Inventors: Brian L. Patterson, Boise, ID (US); Chia Wood, Boise, ID (US); Rodger D. Daniels, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 371 days.

(21) Appl. No.: 10/457,868

(22) Filed: Jun. 9, 2003

(65) Prior Publication Data

US 2004/0250017 A1 Dec. 9, 2004

(51) Int. Cl.
*G06F 12/00* (2006.01)
(52) U.S. Cl. ................................ 711/114; 714/6; 714/7
(58) Field of Classification Search ................ 711/114, 711/161–162; 714/6–7
See application file for complete search history.

(56) References Cited

U.S. PATENT DOCUMENTS

| | | | |
|---|---|---|---|
| 5,596,709 A | 1/1997 | Bond et al. |
| 5,666,512 A | 9/1997 | Nelson et al. |
| 5,812,753 A | 9/1998 | Chiariotti |
| 6,154,853 A | 11/2000 | Kedem |
| 6,269,453 B1 | 7/2001 | Krantz |
| 6,311,251 B1 | 10/2001 | Merritt et al. |
| 6,347,359 B1 | 2/2002 | Smith et al. |
| 6,516,425 B1 | 2/2003 | Belhadj et al. |

*Primary Examiner*—Nasser Moazzami (57) ABSTRACT

Multiple storage devices are monitored to detect failure of a storage device. Upon detection of a storage device failure, a determination is made regarding whether a first data reconstruction technique is available. If a first data reconstruction technique is available, the data is reconstructed from the failed storage device using the first data reconstruction technique. If the first data construction technique is not available, the data is reconstructed from the failed storage device using a second data reconstruction technique.

20 Claims, 9 Drawing Sheets

|  | Disk 1 | Disk 2 | Disk 3 | Disk 4 | Disk 5 | Disk 6 | Disk 7 | Disk 8 | Disk 9 |
|---|---|---|---|---|---|---|---|---|---|
| Stripe 1 | Data A | Data B | Data C | Data D | Data E | Data F | Data G | Parity 1 | |
| Stripe 2 | Data H | Data I | Data J | Data K | Data L | Data M | Data N | Parity 2 | |
| Stripe 3 | Data O | Data P | Data Q | Data R | Data S | Data T | Data U | Parity 3 | Spare |
| Stripe 4 | Data V | Data W | Data X | Data Y | Data Z | Data AA | Data BB | Parity 4 | |
| Stripe 5 | Data CC | Data DD | Data EE | Data FF | Data GG | Data HH | Data II | Parity 5 | |
| Stripe 6 | Data JJ | Data KK | Data LL | Data MM | Data NN | Data OO | Data PP | Parity 6 | |
| 402 | | | | | | | | | |

|  | Disk 1 | Disk 2 | Disk 3 | Disk 4 | 602 | Disk 6 | Disk 7 | Disk 8 | Disk 9 |
|---|---|---|---|---|---|---|---|---|---|
| Stripe 1 | Data A | Data B | Data C | Data D |  | Data F | Data G | Parity 1 | Data E |
| Stripe 2 | Data H | Data I | Data J | Data K | Disk 5 | Data M | Data N | Parity 2 | Data L |
| Stripe 3 | Data O | Data P | Data Q | Data R | Failed | Data T | Data U | Parity 3 | Data S |
| Stripe 4 | Data V | Data W | Data X | Data Y |  | Data AA | Data BB | Parity 4 | Data Z |
| Stripe 5 | Data CC | Data DD | Data EE | Data FF |  | Data HH | Data II | Parity 5 | Data GG |
| Stripe 6 | Data JJ | Data KK | Data LL | Data MM |  | Data OO | Data PP | Parity 6 | Data NN |
| 604 |  |  |  |  |  |  |  |  |  |

*Fig. 6*

|  | Disk 1 | Disk 2 | 702 | Disk 4 |  | Disk 6 | Disk 7 | Disk 8 | Disk 9 |
|---|---|---|---|---|---|---|---|---|---|
| Stripe 1 | Data A | Data B |  | Data D |  | Data F | Data G | Parity 1 | Data E |
| Stripe 2 | Data H | Data I | Disk 3 | Data K | Disk 5 | Data M | Data N | Parity 2 | Data L |
| Stripe 3 | Data O | Data P | Failed | Data R | Failed | Data T | Data U | Parity 3 | Data S |
| Stripe 4 | Data V | Data W |  | Data Y |  | Data AA | Data BB | Parity 4 | Data Z |
| Stripe 5 | Data CC | Data DD |  | Data FF |  | Data HH | Data II | Parity 5 | Data GG |
| Stripe 6 | Data JJ | Data KK |  | Data MM |  | Data OO | Data PP | Parity 6 | Data NN |
| Stripe 7 | Data A | Data B |  | Data C |  | Data D | Data E | Data F | Parity 7 |
| Stripe 8 | Data G | Data H |  | Data I |  | Data J | Data K | Data L | Parity 8 |
| Stripe 9 | Data M | Data N |  | Data O |  | Data P | Data Q | Data R | Parity 9 |
| Stripe 10 | Data S | Data T |  | Data U |  | Data V | Data W | Data X | Parity 10 |
| Stripe 11 | Data Y | Data Z |  | Data AA |  | Data BB | Data CC | Data DD | Parity 11 |
| Stripe 12 | Data EE | Data FF |  | Data GG |  | Data HH | Data II | Data JJ | Parity 12 |
| Stripe 13 | Data KK | Data LL |  | Data MM |  | Data NN | Data OO | Data PP | Parity 13 |
| 704 |  |  |  |  |  |  |  |  |  |

*Fig. 7*

|  | Disk 1 | Disk 2 |  | Disk 4 |  | Disk 6 | Disk 7 | Disk 8 | Disk 9 |
|---|---|---|---|---|---|---|---|---|---|
| 802 |  |  | Disk 3 Failed |  | Disk 5 Failed |  |  |  |  |
| Stripe 7 | Data A | Data B |  | Data C |  | Data D | Data E | Data F | Parity 7 |
| Stripe 8 | Data G | Data H |  | Data I |  | Data J | Data K | Data L | Parity 8 |
| Stripe 9 | Data M | Data N |  | Data O |  | Data P | Data Q | Data R | Parity 9 |
| Stripe 10 | Data S | Data T |  | Data U |  | Data V | Data W | Data X | Parity 10 |
| Stripe 11 | Data Y | Data Z |  | Data AA |  | Data BB | Data CC | Data DD | Parity 11 |
| Stripe 12 | Data EE | Data FF |  | Data GG |  | Data HH | Data II | Data JJ | Parity 12 |
| Stripe 13 | Data KK | Data LL |  | Data MM |  | Data NN | Data OO | Data PP | Parity 13 |
| 804 |  |  |  |  |  |  |  |  |  |

METHOD AND APPARATUS FOR SELECTING AMONG MULTIPLE DATA RECONSTRUCTION TECHNIQUES

TECHNICAL FIELD

The systems and methods discussed herein relate to reconstructing data in a storage system having multiple storage devices.

BACKGROUND

Various storage systems are available that use multiple storage devices to provide data storage with improved performance and reliability than an individual storage device. For example, a Redundant Array of Independent Disks (RAID) system includes multiple disks that store data. RAID systems and other storage systems using multiple storage devices are able to provide improved reliability by using parity data. Parity data allows a system to reconstruct lost data if one of the storage devices fails or is disconnected from the storage system. A variety of parity methods are available that permit the reconstruction of data from a failed storage device.

After the lost data is reconstructed, it is typically stored on one or more storage devices in the storage system. Different techniques can be used to store the reconstructed data in the storage system. One technique reserves one or more storage devices in the storage system for future use if one of the active storage devices fails. This technique is referred to herein as a "rebuild in place" technique. The reserved storage devices are commonly referred to as "hot spares". The reserved storage devices remain idle and are not used for data storage unless one of the active storage devices fails. If an active storage device fails, the missing data from the failed device is reconstructed onto one of the reserved storage devices.

A disadvantage of the rebuild in place technique is that one or more storage devices are unused unless there is a failure of an active storage device. Thus, the overall performance of the storage device is reduced because available resources (the reserved storage devices) are not being utilized. Further, if one of the reserved storage devices fails, the failure may not be detected until one of the active storage devices fails and the reserved storage device is needed. Another problem with this technique occurs when all of the reserved storage devices have been used. If another failure occurs, data reconstruction is not possible because there are no unused storage devices available. Thus, the storage system remains in a degraded condition until an unused storage device is added to the storage system or a failed storage device is replaced by a system administrator.

Another technique for reconstructing lost data uses all storage devices to store data, but reserves space on each storage device in the event that a storage device fails. This technique is referred to herein as a "migrating rebuild" technique. Using this technique, the storage system typically realizes improved performance by utilizing all of the storage devices while maintaining space for the reconstruction of data if a storage device fails. In this type of storage system, data is typically striped across the storage devices. This data striping process spreads data over multiple storage devices to improve performance of the storage system. The data striping process is used in conjunction with other methods (e.g., involving the use of parity information) to provide fault tolerance and/or error checking. The parity data provides a logical connection that relates the data spread across the multiple storage devices.

A problem with the above technique arises from the logical manner in which data is striped across the storage devices. To reconstruct data from a failed storage device and store that data in the unused space on the remaining storage devices, the storage system relocates all of the data on all of the storage devices (i.e., not just the data from the failed storage device). Relocation of all data in a data stripe is time consuming and uses a significant amount of processing resources. Additionally, input/output requests by host equipment coupled to the storage system are typically delayed during this relocation of data, which is disruptive to the normal operation of the host equipment.

Accordingly, there exists a need for an improved system and method for data reconstruction in a storage system that uses multiple storage devices.

SUMMARY

The systems and methods described herein select between multiple data reconstruction techniques after a storage device fails. A particular data reconstruction technique is selected based on the status of the storage system when the device failure occurs.

In one embodiment, multiple storage devices are monitored to detect failure of a storage device. Upon detection of a storage device failure, a procedure determines whether a first data reconstruction technique is available to reconstruct data from the failed storage device. If the first data reconstruction technique is available, the data from the failed storage device is reconstructed using the first data reconstruction technique. If the first data reconstruction technique is not available, the data from the failed storage device is reconstructed using a second data reconstruction technique.

BRIEF DESCRIPTION OF THE DRAWINGS

The present invention is illustrated by way of example and not limitation in the figures of the accompanying drawings. These figures merely represent one or more possible embodiments of the invention. Similar reference numbers are used throughout the figures to reference like components and/or features.

DETAILED DESCRIPTION

The systems and methods described herein select among multiple data reconstruction techniques after the failure of a storage device in a storage system containing multiple storage devices. Instead of using a single data reconstruction technique, the systems and methods discussed herein select among multiple data reconstruction techniques based on the status of the storage system at the time of the device failure. As described herein, a particular data reconstruction process may be terminated in favor of a different data reconstruction process if a new storage device is detected or if the state of the array changes in such a way that a different data reconstruction process would be preferable.

Particular examples described herein discuss storage systems that utilize multiple disks and various parity techniques. However, the systems and methods discussed herein can be applied to any type of storage device and any data storage technique. For example, storage devices may include disks, memory devices, or any other data storage mechanism. Further, any parity and/or data striping techniques can be utilized with the systems and methods discussed herein to provide for the reconstruction of data from a failed storage device.

Particular storage systems may implement one or more RAID techniques for storing data across multiple storage devices. However, the systems and methods discussed herein can be applied to any data storage technique.

Figure 1:
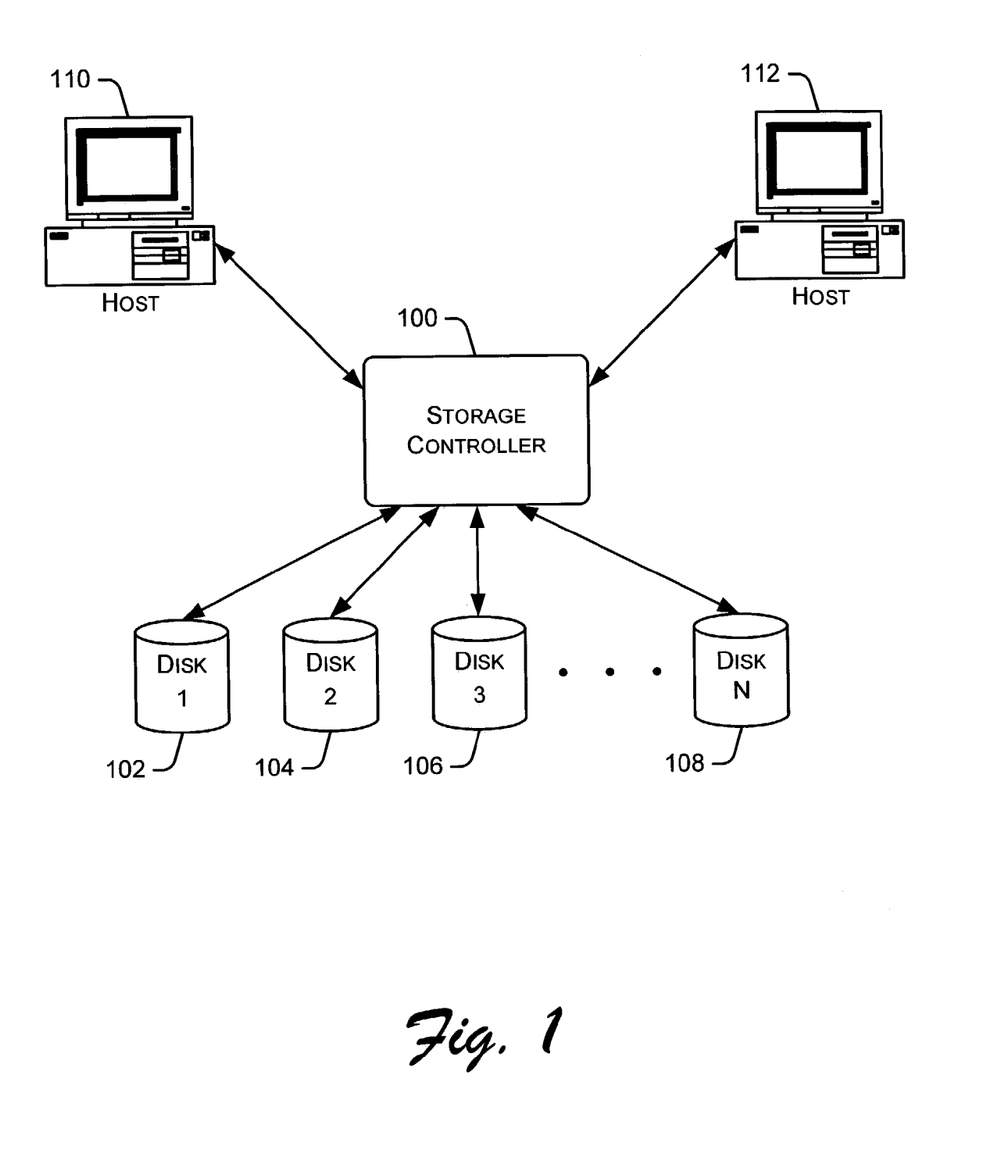
FIG. 1 illustrates an exemplary environment in which a storage controller manages various data storage and data retrieval operations.

FIG. 1 illustrates an exemplary environment in which a storage controller 100 manages various data storage and data retrieval operations. Storage controller 100 receives data read requests and data write requests from one or more hosts 110 and 112. A host may be any type of computer, such as a workstation, a laptop computer, a handheld computer, or a server. Alternatively, a host may be any other type of computing device. Although FIG. 1 illustrates two hosts 110 and 112, a particular storage controller 100 may be coupled to any number of hosts.

Storage controller 100 is also coupled to multiple disks 102, 104, 106 and 108. A particular storage controller can be coupled to any number of disks or other storage devices. The number of active disks may change as existing disks fail or are removed from the system. Also, new disks may be added to the system (e.g., to increase storage capacity, to replace a failed disk, or to provide an additional spare disk) by a system administrator.

As discussed herein, storage controller 100 handles the storage and retrieval of data on the multiple disks 102–108. In a particular embodiment, storage controller 100 is capable of implementing various types of RAID (Redundant Array of Independent Disks) technology. Alternatively, storage controller may implement other technologies or procedures that allow data to be reconstructed after a storage device fails. Storage controller 100 may be a separate device or may be part of a computer system, such as a server. Additionally, disks 102–108 may be located in the same device as storage controller 100 or in a separate device coupled to storage controller 100. In one embodiment, disks 102–108 have approximately equal storage capacities.

Figure 2:
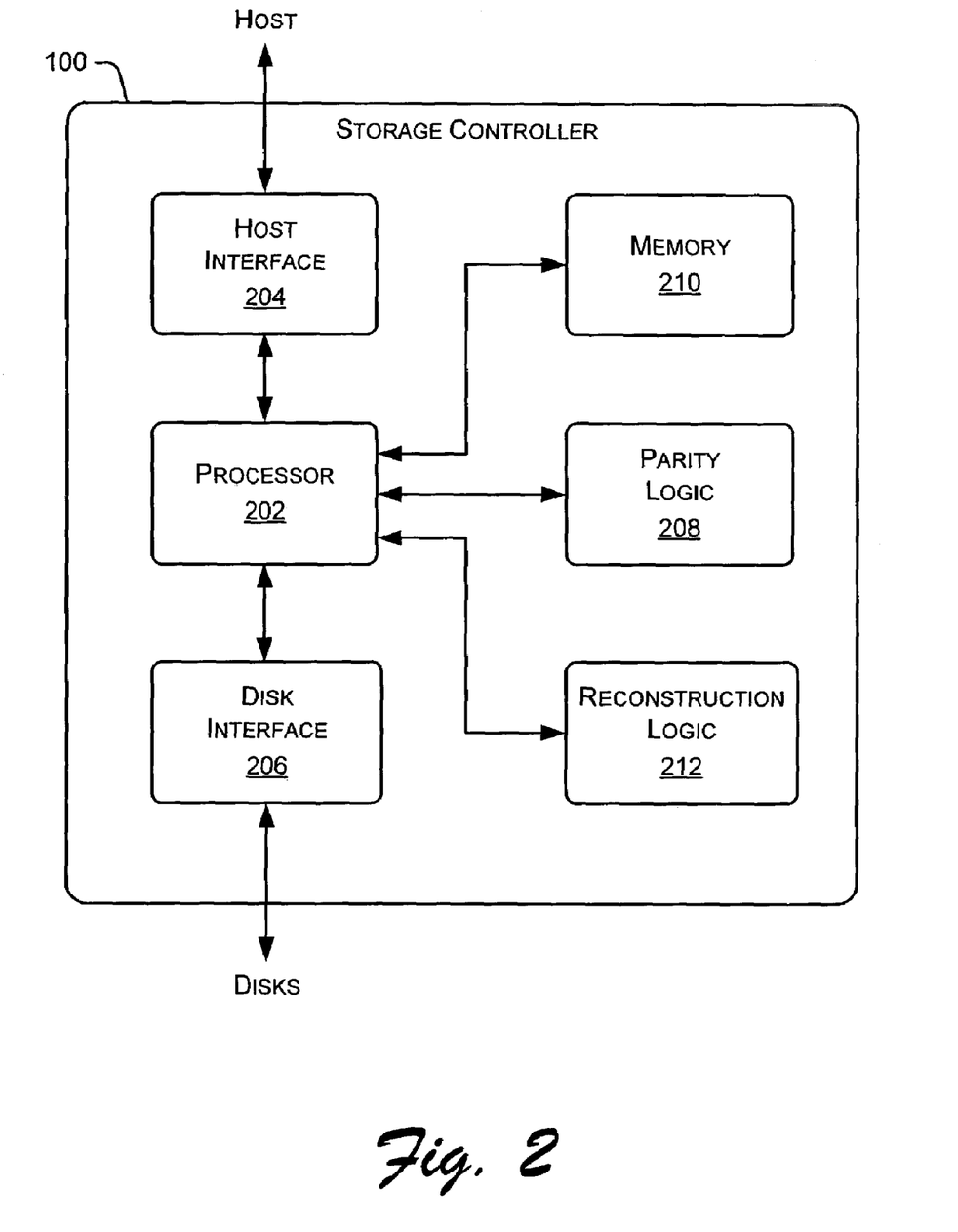
FIG. 2 is a block diagram of an exemplary storage controller capable of implementing the procedures discussed herein.

FIG. 2 is a block diagram of storage controller 100, which is capable of implementing the procedures discussed herein. A processor 202 performs various operations and tasks necessary to manage the data storage and data retrieval requests received from hosts 110 and 112 (FIG. 1). Additionally, processor 202 performs various functions to reconstruct lost data as a result of a storage device failure, as described herein.

Processor 202 is coupled to a host interface 204, which provides a bidirectional data communication interface to one or more hosts. Processor 202 is also coupled to a storage interface 206, which provides a bidirectional data communication interface to multiple disks or other storage devices. Parity logic 208 is coupled to processor 202 and provides processor 202 with the logic necessary to generate parity information and reconstruct lost data based on parity information. Parity logic 208 may include multiple parity techniques depending on the types of parity supported by storage controller 100. Parity logic 208 may also include information regarding different RAID levels that are supported by storage controller 100. Memory 210 is also coupled to processor 202 and stores various information used by processor 202 when carrying out its tasks. Memory 210 may include volatile memory, non-volatile memory, or a combination of volatile and non-volatile memory. Processor 202 is further coupled to reconstruction logic 212, which contains one or more techniques for reconstructing data after a storage device failure. For example, reconstruction logic 212 may include information regarding the "rebuild in place" and the "migrating rebuild" techniques.

The embodiment of FIG. 2 represents one possible configuration of storage controller 100. It will be appreciated that various other storage controller configurations can be used to implement the procedures discussed herein.

As mentioned above, in a particular embodiment, storage controller 100 is capable of implementing RAID technology. RAID systems use multiple storage devices (e.g., disks) in combination with parity data to improve reliability and fault tolerance.

Figure 3:
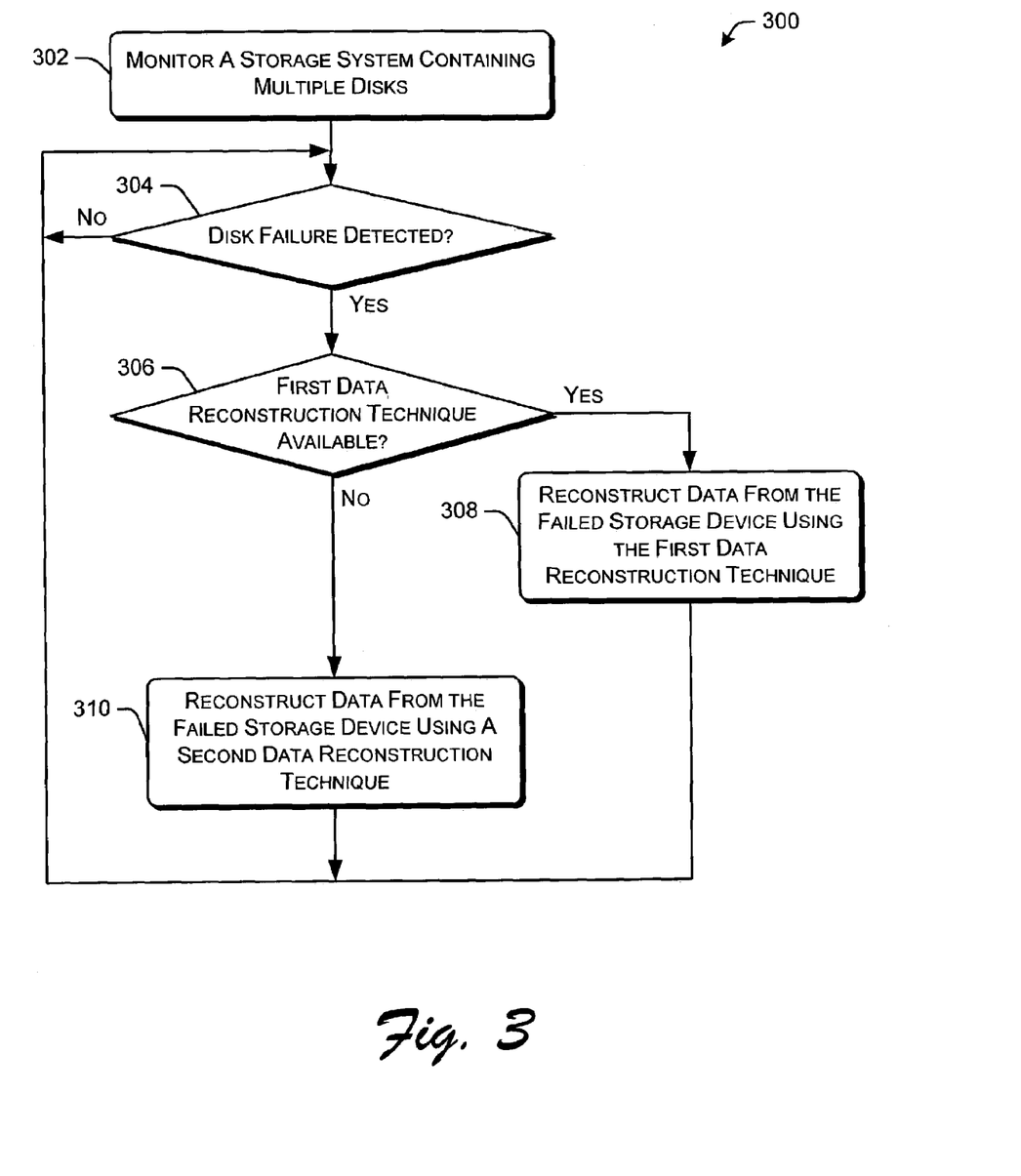
FIG. 3 is a flow diagram illustrating an embodiment of a procedure for reconstructing data in response to a disk failure.

FIG. 3 is a flow diagram illustrating an embodiment of a procedure 300 for reconstructing data in response to a disk failure. Initially, procedure 300 monitors a storage system containing multiple disks (block 302). In one embodiment, the storage system is a RAID system. The procedure monitors the storage system and detects failure of a disk in the storage system (block 304). When a disk failure is detected, procedure 300 determines whether a first data reconstruction technique is available (block 306). The first data reconstruction technique may be a "first choice" of the system administrator for reconstructing lost data. If the first data reconstruction technique is available, the procedure reconstructs data from the failed storage device using the first data reconstruction technique (block 308).

Whether or not the first data reconstruction technique is available may depend on the resources used by the first data reconstruction technique. For example, if the first data reconstruction technique uses a spare storage device and there are no spare storage devices available, then the first data reconstruction technique cannot be utilized until a spare storage device becomes available. Additionally, the first data reconstruction technique may need a particular amount of storage space on one or more storage devices. If the necessary storage space is not available, then the first data construction technique cannot be utilized.

In other embodiments, particular hardware or software in a storage system may support particular data reconstruction techniques. If a desired technique is not supported by the components of the storage system, that technique is not available for implementation. In particular embodiments, a storage system may support data reconstruction techniques that support various RAID types. If a failed device contains a RAID type that is not supported by a particular data reconstruction technique, a different reconstruction technique can be selected.

If the first data reconstruction technique is not available, the procedure reconstructs data from the failed storage device using a second data reconstruction technique (block 310). In a particular example, the first data reconstruction technique is the "rebuild in place" technique discussed herein and the second data reconstruction technique is the "migrating rebuild" technique discussed herein. Another data reconstruction technique includes relocating data from a portion of a data stripe on a failed disk into unused storage spaces on active storage devices. This data reconstruction technique differs from migrating rebuild in that it moves data that was directly affected by the failed disk and leaves all other data untouched. In a disk that contains RAID 1 data, another reconstruction technique causes the disk to copy itself to a second (unused) disk. When the copying process is finished, the controller is notified that the copying is complete. This example allows the copying of the data to be performed while reducing involvement by the controller. Particular data reconstruction techniques may use a hardware component that quickly calculates, for example, the parity information (or missing data from the parity information) for RAID5 or RAID 6 data.

In alternate embodiments, the procedure may first identify all reconstruction techniques that are available and choose, for example, the highest rated technique or the fastest technique as the "first data reconstruction technique".

Figure 4:
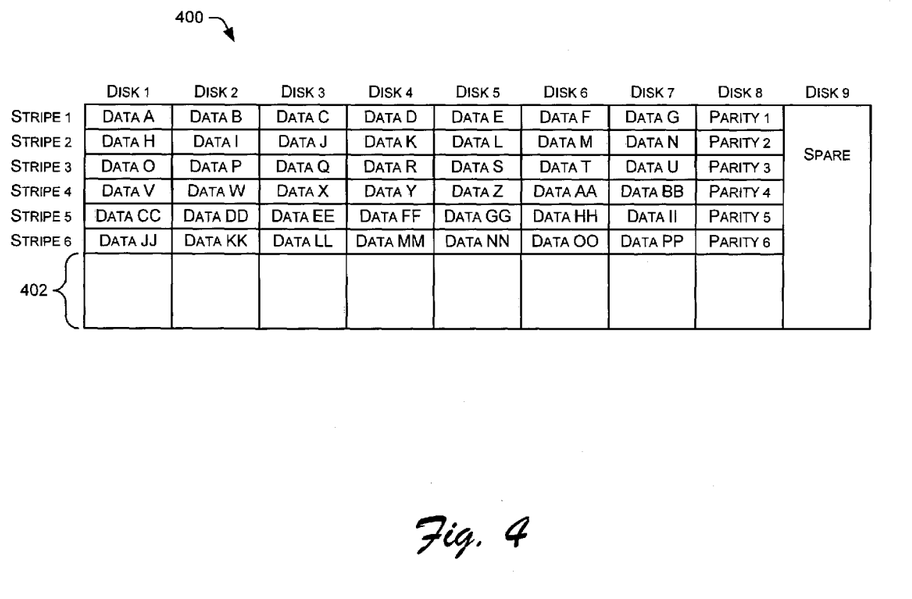
FIG. 4 illustrates an exemplary arrangement of data and parity information stored on a system having eight active disks and one spare disk.

FIG. 4 illustrates an exemplary arrangement 400 of data and parity information stored on a system having eight active disks and one spare disk. The storage capacity of each disk (labeled Disk 1 through Disk 9) in FIG. 4 is represented by a column. Disk 9 is an unused spare disk that is not used to store data until an active disk (Disk 1 through Disk 8) fails. Although six data stripes are shown in FIG. 4, a typical storage system may contain any number of data stripes. In a particular embodiment, each of the six data stripes in FIG. 4 are RAID level 5 stripes. RAID level 5 provides data striping at the block level and parity information. Each data block is written to a disk and parity information for each data stripe is stored on one of the disks. The parity information is used to reconstruct data from a failed disk. In the example of FIG. 4, data in a particular stripe is stored on Disk 1 through Disk 7 and the associated parity information is stored on Disk 8. For example, stripe 1 contains Data A—Data G stored on Disk 1—Disk 7, and associated parity data (Parity 1) stored on Disk 8.

The last row of FIG. 4, identified by reference number 402, represents unused storage space on each disk. This unused storage space is available for reconstruction of data and/or parity information if one or more of the disks fail. The amount of unused storage space on each disk may vary depending on one or more factors, such as the capacity of the disk and the amount of data already stored on the disk.

Figure 5:
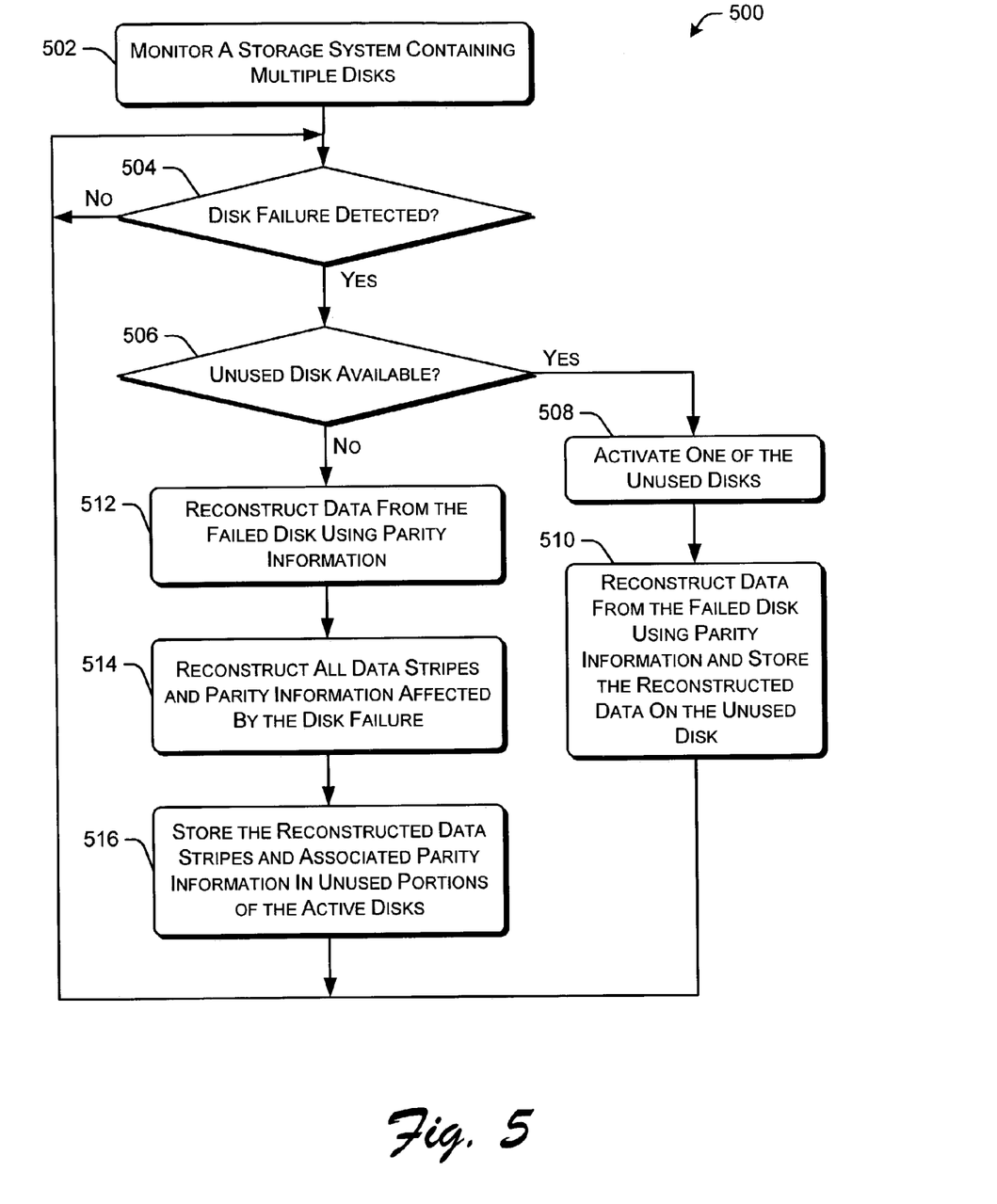
FIG. 5 is a flow diagram illustrating an embodiment of a procedure for reconstructing data after a disk failure.

FIG. 5 is a flow diagram illustrating an embodiment of a procedure 500 for reconstructing data after a disk failure. The procedure monitors a storage system containing multiple disks or other storage devices (block 502). At block 504, the procedure monitors the storage system to identify a failure of any of the multiple disks. If a disk failure is detected, the procedure determines whether there is an unused disk available in the storage system (block 506). If there is an unused disk available, one of the unused disks is activated (block 508). The procedure then reconstructs data from the failed disk using parity information and stores the reconstructed data on the activated disk (block 510), thereby restoring the storage system to the fault tolerant state that existed prior to the disk failure.

If an unused disk was not available at block 506, the procedure reconstructs data from the failed disk using parity information (block 512). The procedure also reconstructs all data stripes and associated parity data affected by the disk failure (block 514). The data stripes can be reconstructed using, for example, the reconstructed data from the failed disk. The reconstructed data stripes and associated parity data are stored in unused portions of the active disks (block 516). The unused portions of the active disks include, for example, the storage space identified by reference numeral 402 in FIG. 4. Thus, although there was no unused disk available, the storage system is restored to the fault tolerant state that existed prior to the disk failure. Although steps 512, 514 and 516 are shown as being performed sequentially, they are often performed concurrently. For example, reconstructed data from the failed disk may be stored in unused portions of the active disks as the data is reconstructed. Similarly, reconstructed data stripes and parity information may be stored in unused portions of the active disks as the data stripes and parity information is reconstructed.

Figure 6:
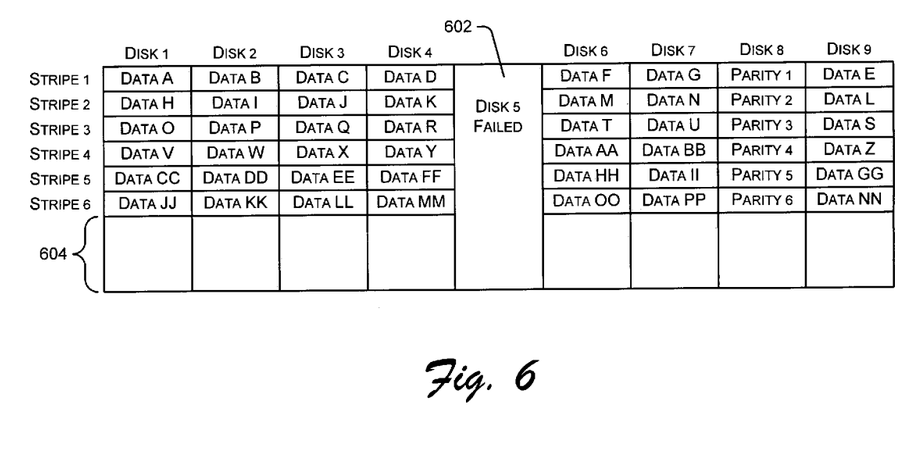
FIG. 6 illustrates the data and parity information of FIG. 4 after a disk failure occurs.

FIG. 6 illustrates the data and parity information of FIG. 4 after a disk failure occurs. In this example, Disk 5 failed or is no longer accessible by the storage controller. As used herein, "failure" of a storage device refers to the situation in which the storage controller cannot access data stored on the storage device. For example, a "failure" may be the result of a failed storage device, removal or disconnection of a storage device, or failure of another component or system necessary to communicate with the storage device.

The data formerly stored on Disk 5 is represented as a blank column 602. As a result of the failure of Disk 5, Data E, Data L, Data S, Data Z, Data GG and Data NN are no longer available. After the failure of Disk 5, the storage system is in a degraded state and the multiple disks are in need of data reconstruction.

As shown in FIG. 6, the data stored on failed Disk 5 has been reconstructed on the spare disk (Disk 9). Using the procedure of FIG. 5, when the failure of Disk 5 occurred, the procedure detected the disk failure and determined whether an unused disk was available. Since there was an unused disk available (Disk 9), the procedure activated Disk 9 and reconstructed the data from Disk 5 onto Disk 9 using parity information stored on Disk 8. The unused portions of the active disks continue to include the storage space identified by reference numeral 402.

Figure 7:
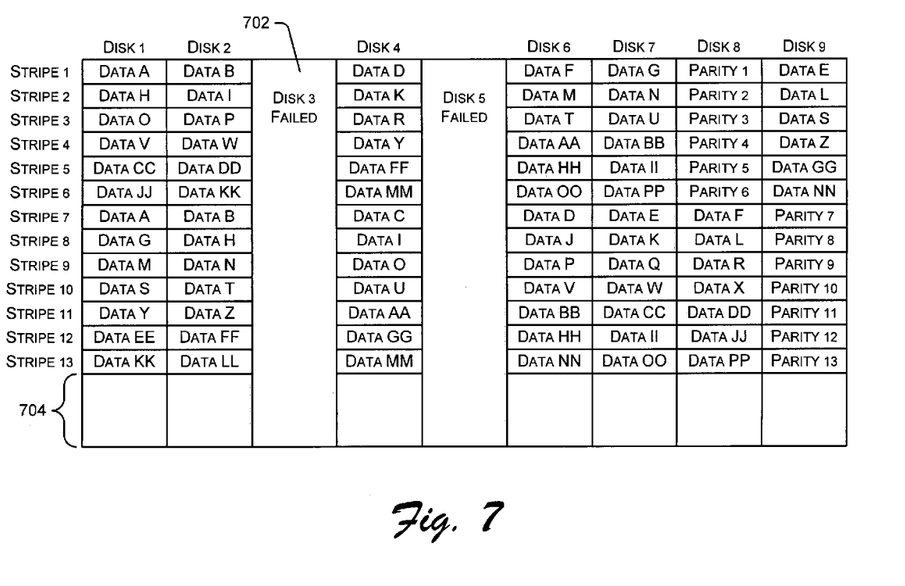
FIG. 7 illustrates the data and parity information of FIG. 6 after a second disk failure occurs.

FIG. 7 illustrates the data and parity information of FIG. 6 after a second disk failure occurs. In this example, Disk 3 failed or is no longer accessible by the storage controller. The data formerly stored on Disk 3 is represented as a blank column 702. As a result of the failure of Disk 3, Data C, Data J, Data Q, Data X, Data EE and Data LL are no longer available. After the failure of Disk 3, the storage system is in a degraded state and the multiple disks are in need of data reconstruction.

As shown in FIG. 7, the data stored on failed Disk 3 has been reconstructed into new stripe 7—stripe 13 using Disk 1, Disk 2, Disk 4 and Disks 6–9 using the migrating rebuild technique. Disk 1, Disk 2, Disk 4 and Disks 6–9 are referred to as the "active disks". Using the procedure of FIG. 5, when the failure of Disk 3 occurred, the procedure determined that there were no unused disks available. The procedure then reconstructed the data from Disk 3 using parity information stored on Disk 8. The procedure also reconstructed all data stripes (e.g., data stripes 1–6) and associated parity information affected by the failure of Disk 3. In this example, data stripes 1–6 were affected by the failure of Disk 3. Recalculation of the parity information was performed according to the mathematical equation associated with the parity technique.

The reconstructed data, reconstructed data stripes (stripes 7–13) and the associated parity information (parity 7–13) are stored in unused portions of the active disks (e.g., the area identified by reference number 602 in FIG. 6). In this example, the data contained in the original six stripes (stripes 1–6) is reconstructed into seven stripes (stripes 7–13) due to the additional failed disk (Disk 3). The original six stripes were stored data across eight disks, but the reconstructed stripes store data across seven disks. Thus, an additional stripe is needed to store all of the data across seven disks. Since the reconstructed stripes have different groups of data, the parity information associated with each reconstructed stripe is different from the parity information associated with the original stripes.

After the reconstructed data stripes and the associated parity information are stored on the active disks, the storage locations associated with the previous data stripes (stripes 1–6) can be deleted (or deallocated), thereby allowing use of the storage locations by other data. Additional unused portions of the active disks are identified by reference numeral 604.

In an alternate embodiment, after each data stripe is reconstructed in the unused space, the storage locations previously associated with the data stripe are deallocated. In the example of FIG. 7, after stripe 1 is reconstructed to stripes 7 and 8, stripe 1 is deallocated. After stripe 2 is reconstructed to stripes 8 and 9, stripe 2 is deallocated. This process continues until all stripes have been reconstructed.

Figure 8:
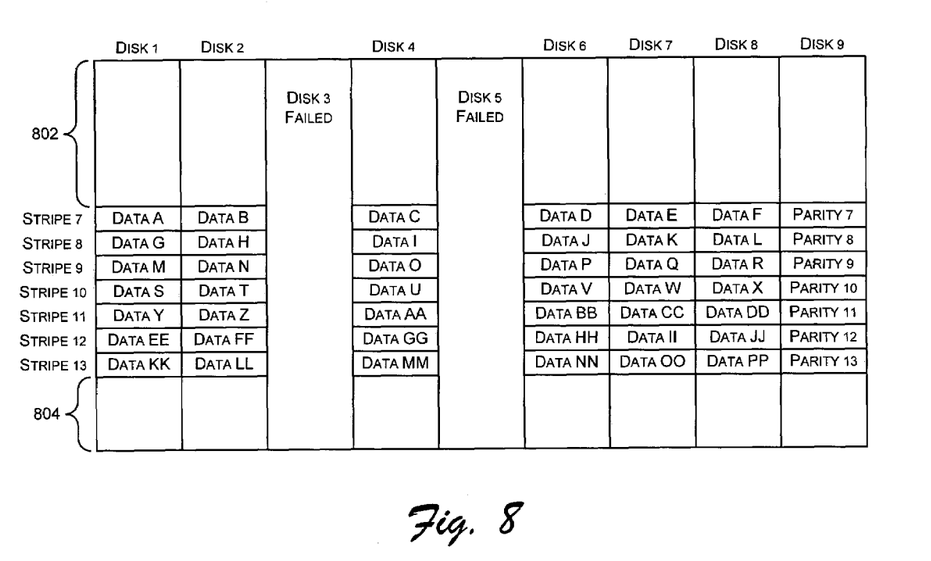
FIG. 8 illustrates the data and parity information of FIG. 7 after the original data stripes and the associated parity information are deallocated.

FIG. 8 illustrates the data and parity information of FIG. 7 after the original data stripes and the associated parity information are deallocated. The storage locations generated by deallocation of the original stripes and associated parity information are identified by reference numeral 802. Additional unused portions of the active disks are identified by reference numeral 804. Unused portions 802 and 804 are available for storing new data or storing reconstructed data resulting from another disk failure.

Figure 9:
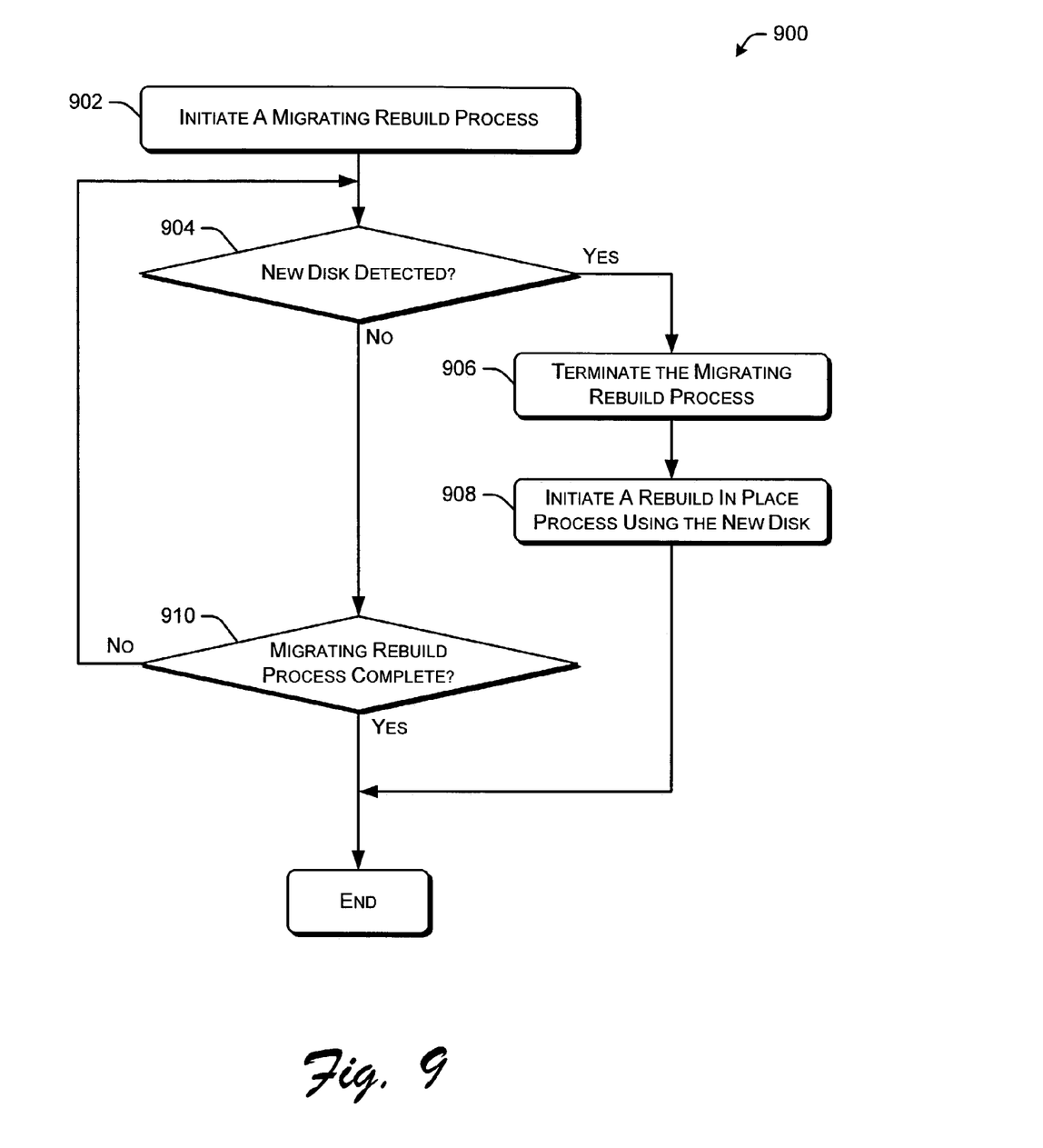
FIG. 9 is a flow diagram illustrating an embodiment of a procedure for changing reconstruction procedures in response to addition of a new disk to the storage system.

FIG. 9 is a flow diagram illustrating an embodiment of a procedure 900 for changing reconstruction procedures in response to addition of a new disk to the storage system. The procedure begins by initiating a migrating rebuild process (block 902). When the migrating rebuild process is initiated, the storage system does not contain any unused disks. Thus, the rebuild in place technique is not available when procedure 900 begins.

During execution of the migrating rebuild process, procedure 900 determines whether a new disk has been added to the storage system (block 904). If a new disk is detected, the procedure terminates the migrating rebuild process (block 906) and initiates a rebuild in place process using the new disk (block 908).

If a new disk is not detected at block 904, procedure 900 determines whether the migrating rebuild process is complete (block 910). If the migrating rebuild process is complete, the procedure ends having successfully rebuilt the data from a failed storage device. If the migrating rebuild process is not complete at block 910, the procedure returns to block 904 to check for the addition of a new disk. This loop between blocks 904 and 910 continues until a new disk is detected or the migrating rebuild process is completed.

The procedure of FIG. 9 has a preference for the rebuild in place technique. Typically, the rebuild in place technique is faster and requires less computational resources than the migrating rebuild technique. Thus, if a migrating rebuild process is being executed when a new disk becomes available, the procedure terminates the migrating rebuild process in favor of the preferred rebuild in place technique.

The systems and methods discussed herein are applicable to any storage system using multiple storage devices. Further, these systems and methods can be applied to any type of storage device (or memory device) and any data recovery technique.

Although the description above uses language that is specific to structural features and/or methodological acts, it is to be understood that the method and apparatus for selecting among multiple data reconstruction techniques defined in the appended claims is not limited to the specific features or acts described. Rather, the specific features and acts are disclosed as exemplary forms of implementing the systems and methods described herein.

The invention claimed is:

1. A method comprising:
monitoring a plurality of storage devices;
upon detecting a failure of a storage device:
determining whether an unused storage device is available;
if an unused storage device is available, reconstructing data from the failed storage device using parity information associated with the data being reconstructed and storing the reconstructed data on the unused storage device;
if no unused storage devices are available:
reconstructing data from the failed storage device using parity information associated with the data being reconstructed and storing the reconstructed data on unused portions of active storage devices;
if a new storage device is detected before completing the process of reconstructing data and storing the reconstructed data on unused portions of active storage devices:
terminating the process of reconstructing data and storing the reconstructed data on unused portions of active storage devices; and
reconstructing data from the failed storage device using the identified parity information and storing the reconstructed data on the new storage device.

2. A method as recited in claim 1, wherein storing the reconstructed data on the unused storage device includes activating the unused storage device.

3. A method as recited in claim 1, wherein data is stored on the plurality of storage devices using data stripes written across at least two storage devices.

4. A method as recited in claim 1, wherein data is stored on the plurality of storage devices using a parity technique that permits recovery of data from the failed storage device.

5. A method as recited in claim 1, wherein the plurality of storage devices is a redundant array of independent disks.

6. A method as recited in claim 1, further comprising:
creating new parity data associated with the reconstructed data; and
storing the new parity data on unused portions of the storage devices that did not fail.

7. A method comprising:
monitoring a plurality of storage devices;
upon detecting a failure of a storage device:
identifying a first data reconstruction technique for reconstructing data from the failed storage device;

identifying a second data reconstruction technique for reconstructing data from the failed storage device;

determining whether the first data reconstruction technique is available to reconstruct data from the failed storage device;

if the first data reconstruction technique is available, reconstructing data from the failed storage device using the first data reconstruction technique;

if the first data reconstruction technique is not available, reconstructing data from the failed storage device using the second data reconstruction technique.

8. A method as recited in claim 7, wherein the first data reconstruction technique is a rebuild in place technique.

9. A method as recited in claim 7, wherein the second data reconstruction technique is a migrating rebuild technique.

10. A method as recited in claim 7, further comprising allocating a portion of each of the plurality of storage devices to store reconstructed data and associated parity information using the second data reconstruction technique.

11. A method as recited in claim 7, wherein data is stored in the plurality of storage devices using a plurality of data stripes, wherein each data stripe is stored across multiple disks.

12. A method comprising:

identifying data contained on a failed storage device in a storage system;

identifying parity information associated with the identified data;

determining whether an unused storage device is available;

if an unused storage device is available, reconstructing data from the failed storage device using the identified parity information and storing the reconstructed data on the unused storage device;

if an unused storage device is not available:
reconstructing data from the failed storage device using the identified parity information and initiating storing the reconstructed data on unused portions of active storage devices;

if a new storage device is detected before completing the process of reconstructing data and storing the reconstructed data on unused portions of active storage devices:
terminating the process of reconstructing data and storing the reconstructed data on unused portions of active storage devices; and
reconstructing data from the failed storage device using the identified parity information and storing the reconstructed data on the new storage device.

13. A method as recited in claim 12, wherein storing the reconstructed data on the new storage device utilizes a rebuild in place technique.

14. An apparatus comprising:
a disk interface coupled to a plurality of storage disks;
parity logic;
reconstruction logic; and
a processor coupled to the disk interface, the parity logic and the reconstruction logic, wherein upon detection of a disk failure, the processor is configured to identify a first data reconstruction technique and a second data reconstruction technique for reconstructing data from the failed disk, the processor further configured to determine whether the first data reconstruction technique is available to reconstruct data from the failed disk and, if available, to reconstruct the data from the failed disk using the first data reconstruction technique, and wherein the processor is configured to reconstruct data from the failed disk using the second data reconstruction technique if the first data reconstruction technique is not available.

15. An apparatus as recited in claim 14, wherein data is stored on the plurality of disks using data stripes written across at least two disks.

16. An apparatus as recited in claim 14, wherein data is stored on the plurality of disks using a parity technique that permits recovery of data from the failed disk.

17. An apparatus as recited in claim 14, wherein the first data reconstruction technique uses a spare disk to reconstruct data from the failed disk.

18. An apparatus as recited in claim 14, wherein the second data reconstruction technique utilizes unused portions of active disks to reconstruct data from the failed disk.

19. One or more computer-readable media having stored thereon a computer program that, when executed by one or more processors, causes the one or more processors to:

identify data stripes containing data stored on a failed disk in a storage system;

identify parity information associated with each of the identified data stripes;

determine whether an unused disk is available;

if an unused disk is available, reconstruct data from the failed disk using the identified parity information and store the reconstructed data on the unused disk;

if an unused disk is not available:
reconstruct data from the failed disk using the identified parity information and reconstruct the identified data stripes using the reconstructed data from the failed disk; and
store the reconstructed data and reconstructed data stripes on unused portions of active disks.

20. One or more computer-readable media as recited in claim 19, wherein the one or more processors deallocate storage space used by the identified data stripes containing data stored on the failed disk after the reconstructed data stripes are stored on unused portions of the active disks.

* * * * *